US00RE35202E

United States Patent [19]

Baltensperger et al.

[11] E Patent Number: Re. 35,202

[45] Reissued Date of Patent: Apr. 9, 1996

[54] METHOD FOR THE PRODUCTION OF A STARCH RAW MATERIAL AND A STARCH MILLING SYSTEM

[75] Inventors: Werner Baltensperger, Oberuzwil; Christian Lippuner, Niederuzwil, both of Switzerland

[73] Assignee: Buehler AG, Uzwil, Switzerland

[21] Appl. No.: 343,929

[22] Filed: Nov. 22, 1994

Related U.S. Patent Documents

Reissue of:

[64] Patent No.: 5,165,608
Issued: Nov. 24, 1992
Appl. No.: 832,687
Filed: Feb. 7, 1992

U.S. Applications:

[63] Continuation of Ser. No. 348,484, Mar. 22, 1989, abandoned.

[30] Foreign Application Priority Data

Oct. 6, 1987 [CH] Switzerland ..... 08893/87
Oct. 6, 1988 [WO] WIPO ..... PCT/CH88/0183

[51] Int. Cl.[6] ..... B02C 9/04

[52] U.S. Cl. ..... 241/9; 241/13; 241/159

[58] Field of Search ..... 241/9, 6, 7, 8, 241/10, 11, 12, 13, 29, 76, 159; 127/24, 25, 67; 426/518

[56] References Cited

U.S. PATENT DOCUMENTS

| | | | |
|---|---|---|---|
| 453,364 | 6/1891 | Taylor | 241/9 X |
| 1,287,654 | 12/1918 | Dodds | 426/518 X |
| 2,560,837 | 7/1951 | Alciati et al. | 241/159 X |
| 3,491,952 | 1/1970 | Krolopp | 241/13 |
| 4,220,287 | 9/1980 | Boczewski | 241/9 |

*Primary Examiner*—John Husar
*Attorney, Agent, or Firm*—Finnegan, Henderson, Farabow, Garrett & Dunner

[57] ABSTRACT

The invention is directed to a new method for the production of a starch raw material for subsequently obtaining pure starch from wheat, rye, corn or barley. Fractions of starch which is damaged as little as possible are produced by means of roller grinding and sifting devices. The material is ground repeatedly and sifted with the system of advanced milling, wherein it is suggested in particular to guide the material two to five times via double-grinding stages without sifting between the double grindings. Sifting is effected subsequent to the double grinding. The invention also concerns a starch milling system which comprises two to five double-grinding passes with two grinding-roll pairs which are connected one after the other and are preferably constructed as an eight-roll mill.

14 Claims, 5 Drawing Sheets

METHOD FOR THE PRODUCTION OF A STARCH RAW MATERIAL AND A STARCH MILLING SYSTEM

Matter enclosed in heavy brackets [ ] appears in the original patent but forms no part of this reissue specification; matter printed in italics indicates the additions made by reissue.

This application *is a reissue of 07/832,687, filed Feb. 7, 1992, now U.S. Pat. 5,165,608, which* is a continuation of application Ser. No. 07/348,484, filed Mar. 22, 1989, now abandoned.

TECHNICAL FIELD

The invention is directed to a method for the production of a starch raw material for subsequently obtaining pure starch from wheat, rye, corn or barley, wherein fractions of starch which is damaged as little as possible are produced by means of roll grinding and sifting devices, wherein the material is ground repeatedly and sifted with the system of advanced milling, and to a starch milling system for the production of starch raw material for subsequently obtaining pure starch.

BACKGROUND ART

The most recent development in starch production was determined by two essential findings which contributed considerably to economical production. The first finding was that starch kernels which are damaged during grinding decrease the subsequent yield of pure starch in the starch factory. If the starch is damaged in the production of dough products, for example, the contents of the damaged starch kernels, when cooked, occur as losses in the cooking water and also give the cooking water a milky-white color. But the same is also true in the production of starch. The starch can only be separated from the gluten in an economical manner in that the protein bodies, which are already thread-shaped in themselves, are arranged to form a protein framework (gluten framework). This occurs by way of the formation of dough in the same way as in dough products. The starch crystals can then float out of the protein framework by means of additional water and can be separated. In contrast, the baker wants the starch to be damaged in bread flour so that the flour can quickly absorb much water for the formation of the bread dough.

The second finding consisted in keeping the number of grinding passes used for milling as low as possible, which allowed the initial costs for the mill to be kept as low as possible. The solution corresponding to these two findings is described in the present Applicant's DE-PS No. 2 642 628. Ten to twelve grinding passes are used in this prior art.

DISCLOSURE OF INVENTION

The object of the invention is to achieve a further reduction of the capital expenditure for a starch mill, but while ensuring the product quality, particularly the fractions required for the starch factory, especially the heavy fractions containing the A-starch, but also the total starch containing A- and B-starches.

The solution, according to the invention, is characterized in that the material is guided one to five times via double-grinding stages without sifting between the double grindings and is sifted subsequent to the double grinding in each instance.

In a manner which surprised those skilled in the art, this object was met in its entirety and the precondition was simultaneously created for another stage of development for the preparation of raw material for obtaining starch. In this connection it was necessary to depart completely from the traditional approach to milling practice of previous advanced milling. It is still true that the grinding must be carried out with extreme care and, accordingly, in multiple stages in order to achieve the maximum results with respect to all conventional milled products: opening the kernel, detaching the endosperm portions, carefully grinding the coarse semolina portions, production of the necessary fine fractions without damaging the starch, etc. While the grinding stages in themselves are not omitted, a part of the intermediate sifting can nevertheless be dispensed with by means of the construction of specialized mills—and this has now been shown by the most recent findings—without resulting thereby in a reduction in the quality and output of the fractions required for the production of starch, and this can be done with the same total throughput through the mill. This means that the grinding is still effected in many stages and very carefully.

The omission of a substantial part of the intermediate sifting (almost half) economizes on all the conveying elements previously required for transportation, filters, etc., so that a mill becomes substantially cheaper when the inventive idea is applied consistently. In particular, the operation of a mill, according to the invention, is made more economical by means of reducing the devices to be serviced and by means of reducing the conveying and drive energy. In addition, the reduction of the building volume can bring about noticeable savings.

The new invention allows various particularly advantageous constructions.

It is especially preferable that the material undergo a double grinding two to four times, especially four times. This means the use of eight grinding-roll pairs, which can consist of coarse and fine corrugation and smooth rolls, as customary in known advanced milling. The actual sifting passes are likewise reduced to four, which signifies a reduction of the sifting passes to 40 to 50% compared with the prior art.

However, depending on the raw materials used for grinding, particularly with material which is more difficult to process, it may be advantageous to provide three to five single grindings for reduction with an intermediate sifting in each instance. Of course, this can be effected in such a way that the corresponding roll mills are installed but only put into operation when needed, so that every unnecessary "handling" of the material is avoided and the maximum in careful treatment is ensured in every case.

In addition, it is suggested that the material undergo double grinding at least at $B_1/B_2$, $B_3B_4$, $C_1/C_2$ and $C_3/C_4$.

The new invention is also directed to a starch milling system for the production of starch raw material from wheat, rye, corn or barley for subsequently obtaining pure starch and is characterized in that it comprises one to five double-grinding passes with two grinding-roll pairs arranged one after the other in each instance.

The new invention accordingly allows not only an enormous reduction in terms of process technology, but also an effective reduction of the required machinery and accordingly the overall construction volume. But in this way an unexpected advance was achieved for the construction and operation of starch milling systems.

In addition, the new solution enables, e.g. for the conversion of existing starch mills, the use of three to five of the previously utilized four-roll mills (that is, six to ten roll pairs), wherein two grinding passes without intermediate sifting are connected one directly after the other. However, it is advisable to arrange all roll mills directly adjacent to one another on the same base without offsetting.

On the other hand, it is substantially more advantageous for new systems that the mill comprise one or preferably two eight-roll mills (roll mills with eight rolls) with two sets of grinding-roll pairs located one on top of the other. Large starch mills are expanded simply by means of corresponding parallel operation of the work machines, that is, e.g. twice the quantity of units for twice the throughput capacity.

As can be seen, milling for starch milling systems accordingly reaches a point where the state of the very old fiat milling is reached again with respect to the units which are used (two to three grinding passes), but where virtually all the advantages of advanced milling can be retained.

In addition, the new invention enables a whole range of particularly advantageous constructions and a considerable number of variations. Thus, it is possible to apply only double grindings in a consistent manner without intermediate sifting between the individual double grindings. This results in a very concentrated production sequence. However, in difficult cases it is also possible to provide e.g. one to five single grindings with an intermediate sifting in each instance for the size reduction grinding. This has the advantage that a very high output and purity of the end product can be achieved even with kernel mixtures which are difficult to grind.

Approximately fifteen single passes is state of the art in present-day flour mills, approximately ten to twelve single passes in starch mills. According to the new invention, it is possible to make due with four to five double-grinding passes, that is, a total of eight to ten grinding passes, but eight grinding passes, that is, two eight-roll mechanisms, is especially preferable. It can be seen that the number of roll pairs has been reduced, but particularly the "handling" such as sifting, transportation, etc. has been cut almost in half.

A small mill can accordingly be built with two, possibly three eight-roll mills which comprise two sets of two grinding-roll pairs, which are located one on top of the other, or can be equipped, for example, with two eight-roll mills and one or two four-roll mills.

Every grinding-roll pair preferably comprises its own grinding gap adjustment in each instance, so that the manner of operation of the grinding rolls per se is only changed to a limited extent with respect to input on the part of the miller as compared with DE-PS 2 640 628, for example.

In addition, it is suggested in eight-roll mills that the roll pairs located on top comprise an adjustable feed regulating device in each instance, as well as a funnel-shaped product guide for directly transferring from the respective roll pair located on top to the lower roll pair.

Since expert management of a mill is also important with the new invention, the miller in charge will likewise have corresponding opportunities for monitoring and influencing just as before. Therefore, a grinding gap adjusting device and also a control gate for removal of samples after every grinding pass are assigned to every roll pair. The requirement that milling remain an art, in somewhat the same manner as cooking, is accordingly ensured.

For the purpose of reliable operation, the feed space of the upper roll pair and the feed space of the lower roll pair are connected to an aspirating device via ducts in the eight-roll mechanisms, particularly in the area of the grinding gap. This also allows a high throughput capacity and stable grinding conditions.

In addition, every roll pair is to be completely equipped with individual adjusting devices and devices for protection against foreign bodies, and the rolls of every roll pair preferably have different rotating speeds, wherein a jointly controlled moving-out device is to be assigned to the roll pairs located one on top of the other.

It is especially preferable that the rolls of a roll pair be arranged on the same horizontal plane.

In a further development of the inventive idea, it is especially preferable that a plansifter with a large individual screening surface, a so-called large plansifter, be used which has a screening surface which is approximately 30 to 60%, preferably 40 to 50% larger compared with the known plansifter screens which are presently used for the 4-roll mills. As a result, a mill having a daily processing capacity of approximately 100 to 200 tons comprises, e.g. two eight-roll mechanisms and a single large plansifter. In addition to this, a compact cleaning apparatus, according to the CH-PA No. 04 626/87-6 of the present Applicant, is used for cleaning, so that a compact starch mill is actually formed thereby which in principle has all the substantial advantages of the previous starch mills but also an unexpected reduction in the number of required units and the required space. The entire contents of the CH-PA No. 04 626/87-6 is an integral part of the new solution according to the invention.

A basic unit of a starch mill with corresponding daily capacity comprises a compact cleaning apparatus, two eight-roll mills and a large plansifter.

For optimum management of a new starch mill, the grinding gap adjusting devices are assigned in each instance to a remote control and computer means are provided for storing and retrieving the specific grinding gap adjustments for all grinding tasks as well as all remaining adjusting values of the processing and transporting means.

If the raw material or mixture, respectively, is known, as well as the rest of the parameters such as ambient temperature, air humidity, the state of all units (corrugation of the rolls, screening tension of the plansifters, etc.), the mill can be operated completely automatically over a longer period of time, even without the immediate presence of trained personnel, after a one-time accurate adjustment.

The invention is explained in more detail in the following.

MODES FOR CARRYING OUT THE INVENTION

Figure 1:
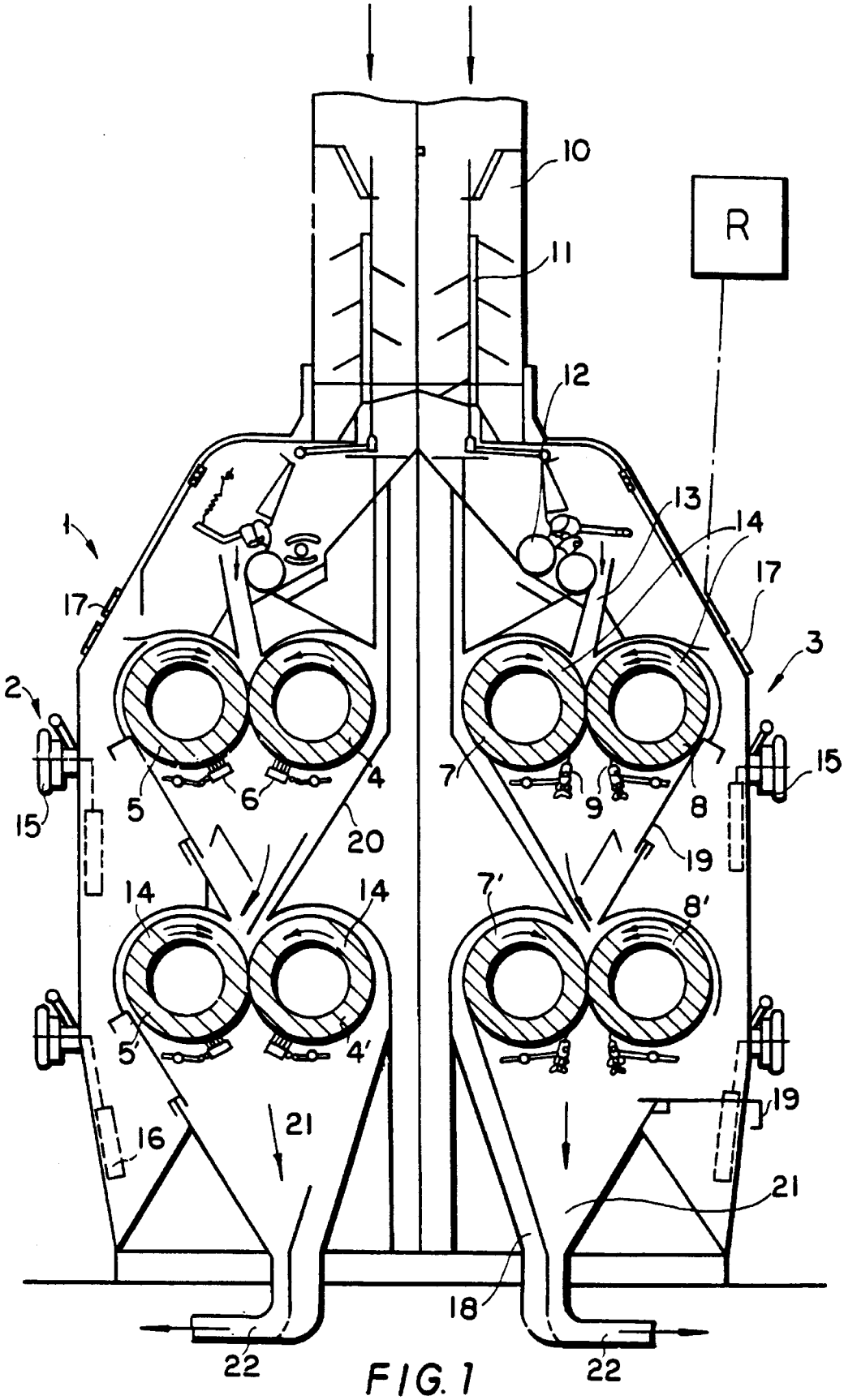
FIG. 1 shows an eight-roll mill.

Reference is now made to FIG. 1. The eight-roll mill 1 comprises two halves, the left half is shown as a bruising pass 2 and the right half is shown as a second reduction pass 3. The bruising passes 2 comprise at least corrugated rolls 4 and 5, respectively, wherein the roll 5 which runs more rapidly is designated in the drawing with two arrows. A wiping brush 6 is located below each roll 4 and 5. Rolls 7 and 8, respectively, which are smooth for the most part, are used in the second reduction passes and wiping blades 9 are used for keeping the surface of the rolls clean. Depending on the specific grinding operation, the respective lower roll pair 4', 5' or 7', 8', respectively, will be the same roll type, coarse corrugation, fine corrugation, or will be constructed as a smooth roll, as the corresponding upper roll.

The material is guided to the left or to the fight into the roll mill 1 via a feed cylinder 10. Only in very large milling capacities is it indicated to construct the left-hand and right-hand roll mill halves identically in such a way that each half must process one half of the product volume. In the drawing, a sensor 11 in the feed cylinder 10 is designed as a so-called "Christmas tree" which controls a product feed 12, so that an arriving quantity of material which flows into the feed cylinder 10 at the top is discharged in the same magnitude by means of the product feed. The material is guided directly into the grinding gap via a feed duct 13. A strong air current is generated in the feed duct 13, which can be ensured in an advantageous manner by means of two air ducts 14 which are guided around the rolls 4, 5 and 7, 8, respectively. The material which is bruised by the upper roll pair 4, 5 is guided directly into the grinding gap of the lower roll pair 4', 5' via a product outlet funnel 21. The air is also aspirated through the air ducts 14 at the lower roll pair 4', 5'. A transfer unit transfers the material to be milled to the intermediate lift-overs by means of a product outlet funnel 21. All four roll pain 4, 5-4', 5'-7, 8-7', 8' can be adjusted with respect to the grinding gap by means of an adjusting device 15. All other devices, such as the means for protecting against foreign bodies, the engaging and disengaging device, etc. are used in the same manner as in standard four-roll mills. In this connection, reference is made to DE-PS No. 27 30 166 in its entirety. It has been shown that the constructional unit for the roll pair which is shown in the aforementioned publication of the present Applicant can also be used to great advantage with the eight-roll mills, so that when eight-roll mills are combined with four-roll mills the same basic construction of the so-called roll package can be taken as a basis in every case, which is an additional advantage for both the manufacturer and the user.

In individual cases, it can be indicated to provide a feed roll or product distribution roll, respectively, above the lower roll pair. However, it is preferable that the engagement and disengagement of the roll be effected for both roll pairs by means of the same sensor 11.

The right half of the drawing also shows a product and air path 18 in the product outlet funnel 21. This can be advantageous particularly with milling materials of the middlings and flour types, since, in this way, a more compact guiding of the falling stream of material is made possible by means of separate air and product paths.

Every grinding-roll pair (4, 5–7, 8) comprises its own grinding gap adjusting device which consists of a handwheel 15 and the corresponding adjusting elements. In addition, a motor-driven adjusting device 16 can be provided, wherein both can monitor the instantaneous distance variable between the two grinding rolls via a display 17. Moreover, the motor-driven adjustment can be effected automatically by means of computers (R) and storage means.

In addition, a control gate 19, which is shown in the right half of the drawing in the closed position at the top and in the opened position at the bottom, is assigned to each grinding-roll pair. The control gate can be opened regardless of whether or not the roll mill is operating. Constant air pressure conditions and, accordingly, constant grinding conditions, are thereby maintained by means of the additional air ducts 14, 18 described above.

Figure 2:
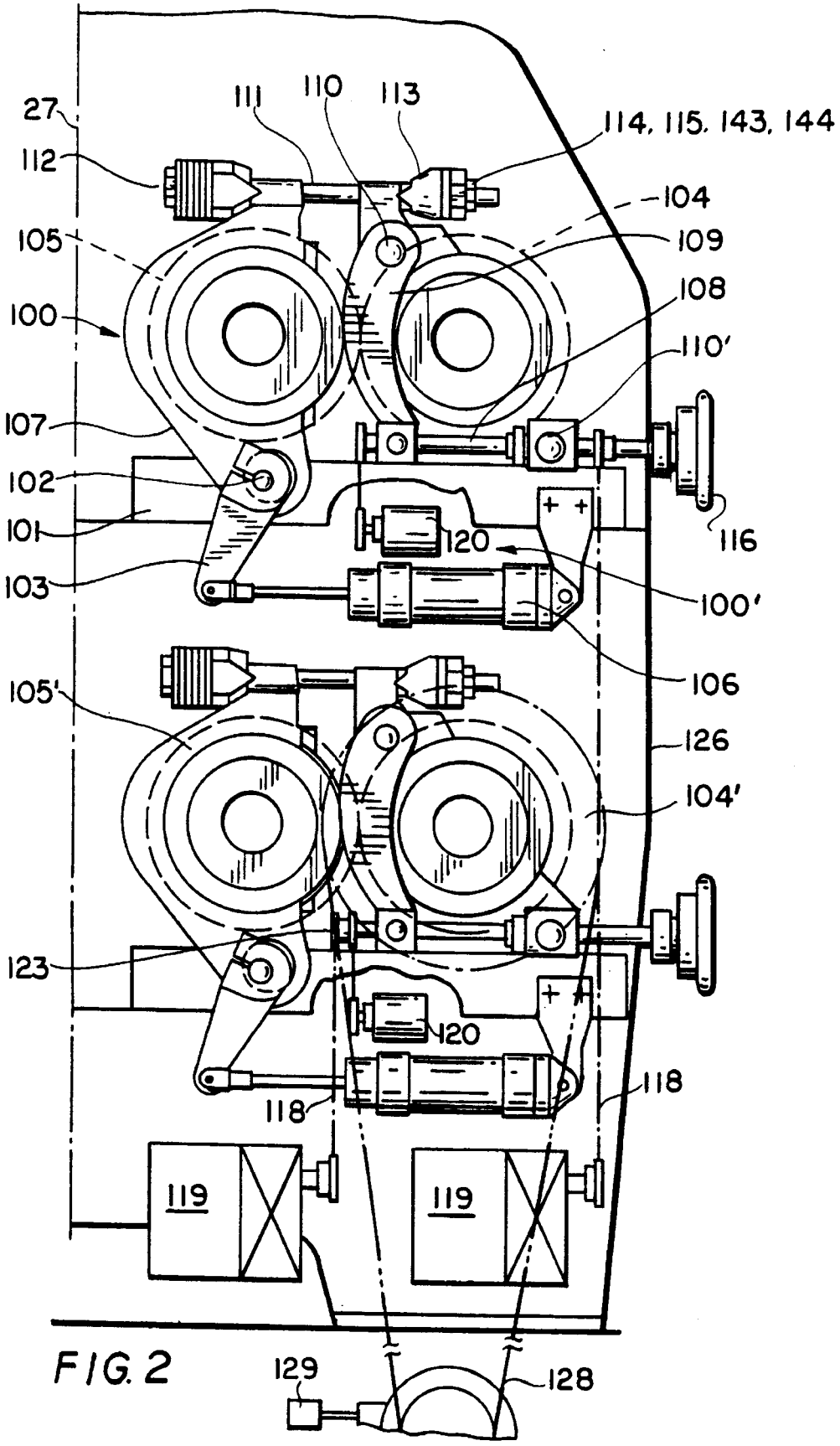
FIG. 2 shows a view of half of FIG. 1 with the adjusting means and drive.

Reference is made in the following to FIG. 2 which shows adjusting members as a first constructional assembly 100 and a controllable adjusting drive as second constructional assembly 100'. The two grinding rolls 104 and 105 are supported on a mutual carrier 101. The movable roll 105 is fastened at a stationary eccentric pin 102 so as to be swivelable, wherein the inward and outward movement is controlled by means of a corresponding lever 103, as well as a disengagement cylinder 106. The eccentric pin 102 is rotated by means of the swiveling movement of the lever 103 and causes a horizontal displacement of the lower portion of the swivelable bearing housing 107, so that the spacing of the two grinding rolls can be roughly adjusted. This device would be too inexact for an accurate adjustment of the grinding rolls. Also, this is only used for bringing the grinding rolls into a moved-in or moved-out position or into two fixed positions. The actual fine adjustment of the grinding rolls 104 and 105 is effected via an adjusting spindle 108 which directly moves an adjusting arm 109 around a stationary pivot bearing 110 by means of rotation. The upper, shorter end of the adjusting arm 109 is connected with the swivelable bearing housing 107 in a force-locking manner via a tie rod 111. The transmission of force is effected via knife edges which are part of an overload spring protection device 112 on one side. On the opposite side, an adjustable pressure head 113, as well as a pressure measuring device 114 with pressure display apparatus 115, are arranged at the tie rod 111. In order to be able to adjust the grinding rolls in a parallel manner during servicing operations, a correction can be effected on the respective necessary side via adjusting screws 143, 144. The adjusting spindle 108 is held so as to be stationary by means of the bearing 110' and can now be actuated via a handwheel 116, which has a display clock directly built into it, or by means of motor power, transmission chain 118 and a gear motor or drive motor 119, respectively. The drive motor 119 is fastened at the roll mill 126 and communicates directly with the adjusting spindle 108 via a slip clutch and a chain wheel.

In addition, a position indicator 120 is directly connected with the transmission chain 118, so that every movement of the chain wheel 123 is recorded in the position indicator 120 and guided further to the desired position. In FIG. 2, in addition, a drive belt 128 for the drive of the grinding rolls 104 and 105, 104' and 105' respectively, is only shown in a suggestive manner. It is possible also to provide an electric power requirement measuring and display device 129 in the drive system. The electric power consumption can accordingly be defined at a lower and upper value, for example, and e.g. the grinding rolls can be moved apart when the preselected range is exceeded.

All signals of a roll mill are preferably coordinated and controlled via a machine computer, wherein the machine computer can request the necessary desired values from a central computer with storage. The position indicator is preferably equipped with a position limiting value switch which is adjustable to preselectable limiting values and can impede an automatic faulty adjustment in this way. The position limiting value switch in the position shown has the advantage that a faulty manual adjustment can also be prevented accordingly, since both the handwheel and the automatic adjustment result in a corresponding distance displacement of the chain 118. In the same way as the adjusting motor 119, the position indicator can be connected with an input-output device which receives and transmits corresponding signals from the machine computer, corresponding to the digital display and manual input keys. In the same way, the pressure measuring and display device 114, 115 can be connected to the machine computer. Depending on the degree to which a roll mill can be expanded, one or more protection devices can be provided at the same roll mill. If, for example, corrugated rolls are installed, monitoring of the grinding pressure is less important; on the other hand, the monitoring of the spacing of the grinding rolls, whether this be effected by means of the position indicator or a distance measuring device, is advantageous. The opposite applies to smooth rolls in which a monitoring of pressure is more advantageous. A computer and the signal lines, which are indicated in a suggestive manner, are supposed to indicate that the computer and memory, respectively, control an entire range of roll mills in a mill, possibly all of them, and, if necessary, also coordinate control functions.

In addition, it has proven to be especially advantageous that the digital display transmit a value corresponding to a time measurement (clock 05:50) and preferably transmits an identical value corresponding to a position indicating apparatus or display clock of the handwheel, respectively.

The great advantage consists in that the experimental values of roll mills which are not automated and not remotecontrollable are compared and can be evaluated for constructing or improving corresponding control programs.

Figure 3:
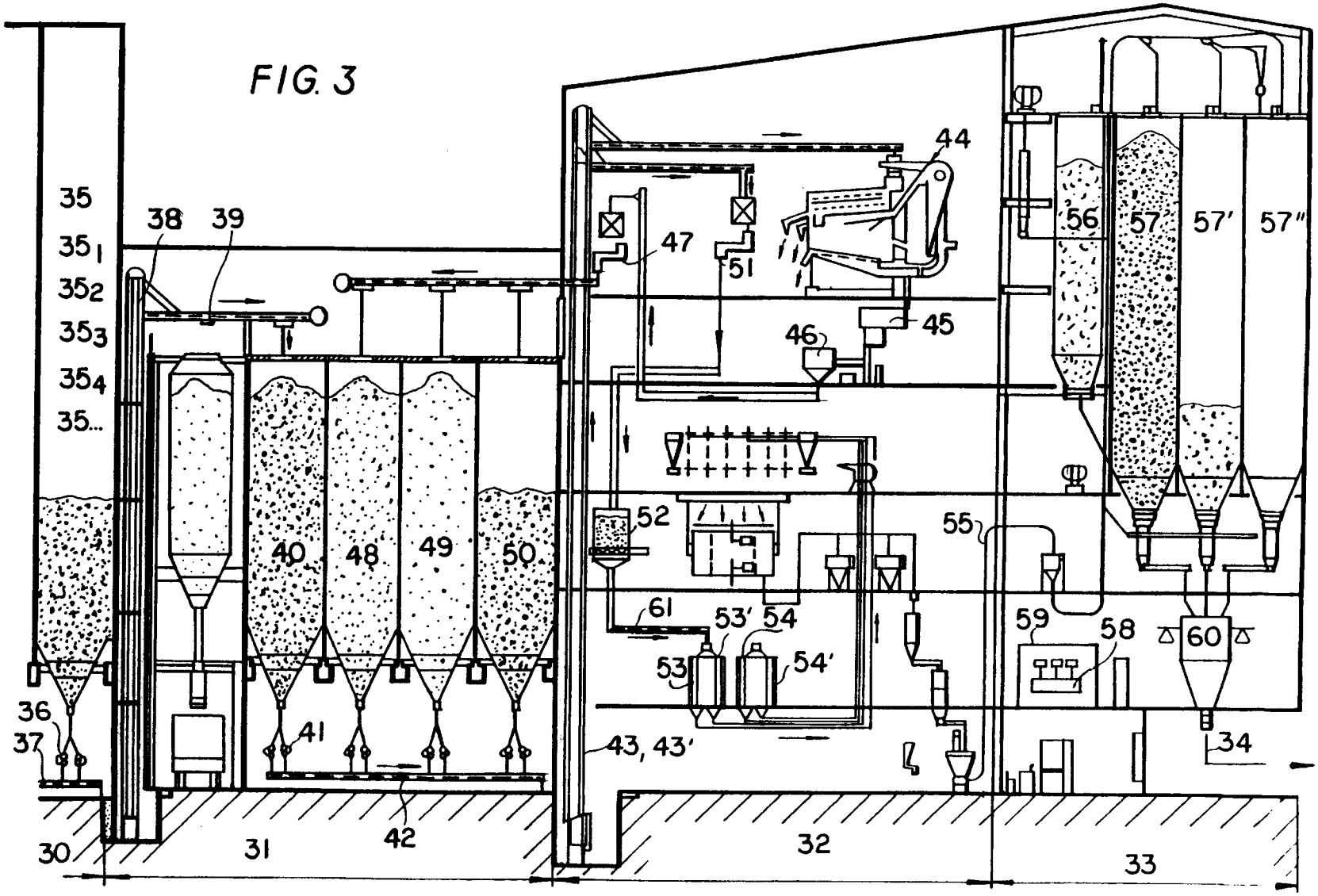
FIG. 3 shows a new starch mill.

FIG. 3 shows a complete starch mill in a greatly simplified manner. Roughly considered, the starch mill consists of a storage silo 30 for the stored grain, mixing and holding boxes 31, an actual processing wing 32, and finished product cells 33. Subsequent to the finished product cells 33, the starch fraction is transferred directly to the starch factory via transporting elements 34.

In particular, the work sequence proceeds as follows: The desired mature of raw grain is provided from storage cells 35, $\mathbf{35}_1$, $\mathbf{35}_2$, $\mathbf{35}_3$, etc. and conveyed into mixing cells 40 via trolleys 36, a horizontal conveyor 37, an elevator 38, and another horizontal conveyor 39. The grain, which has still not been cleaned, is removed from the mixing cell 40 and conveyed into the grain cleaner 44 via scales 41, a horizontal conveyor 42 and an elevator 43. Large extraneous constituents (scalpings) are sifted out, stones are sorted out and hull parts are aspirated away in a compact cleaning apparatus. (Reference is made to CH-PA No. 04 626/87-6 of the present Applicant in its entirety.) Subsequently, the material is delivered to a trieur 45, in which long and round extraneous seed materials are removed, dirt adhering to the kernel material is removed by means of a scouring machine 46, the required quantity of water is added in an intensive wetting device 47 and the material is stored in a holding cell 48 for the necessary period of time. The grain, which has been wetted and let stand for approximately 12 to 48 hours, is removed from one of the holding cells 48, 49 and 50, respectively, lifted over by means of an elevator 43' and, after the addition of 0.1 to 0.3% water (wetting 51 before $B_1$) and a homogenization cell 52, is fed directly to the first grinding pass ($B_1$) or the first double-grinding pass 53, respectively. After four double grindings 53, 53', 54, 54' and a (total of four) sifting passes, the fractions obtained are guided away via a pneumatic conveying system 55, bran is stored in a storage silo 56, and the starch fraction is stored in one of the storage silos 57, 57' or 57". After a subsequent weighing (scale 60), the material is conveyed into the starch factory by means of the transporting elements 34. The entire system control means and locking mechanism, as well as the computer means 58, are accommodated in a control room 59.

Figure 4:
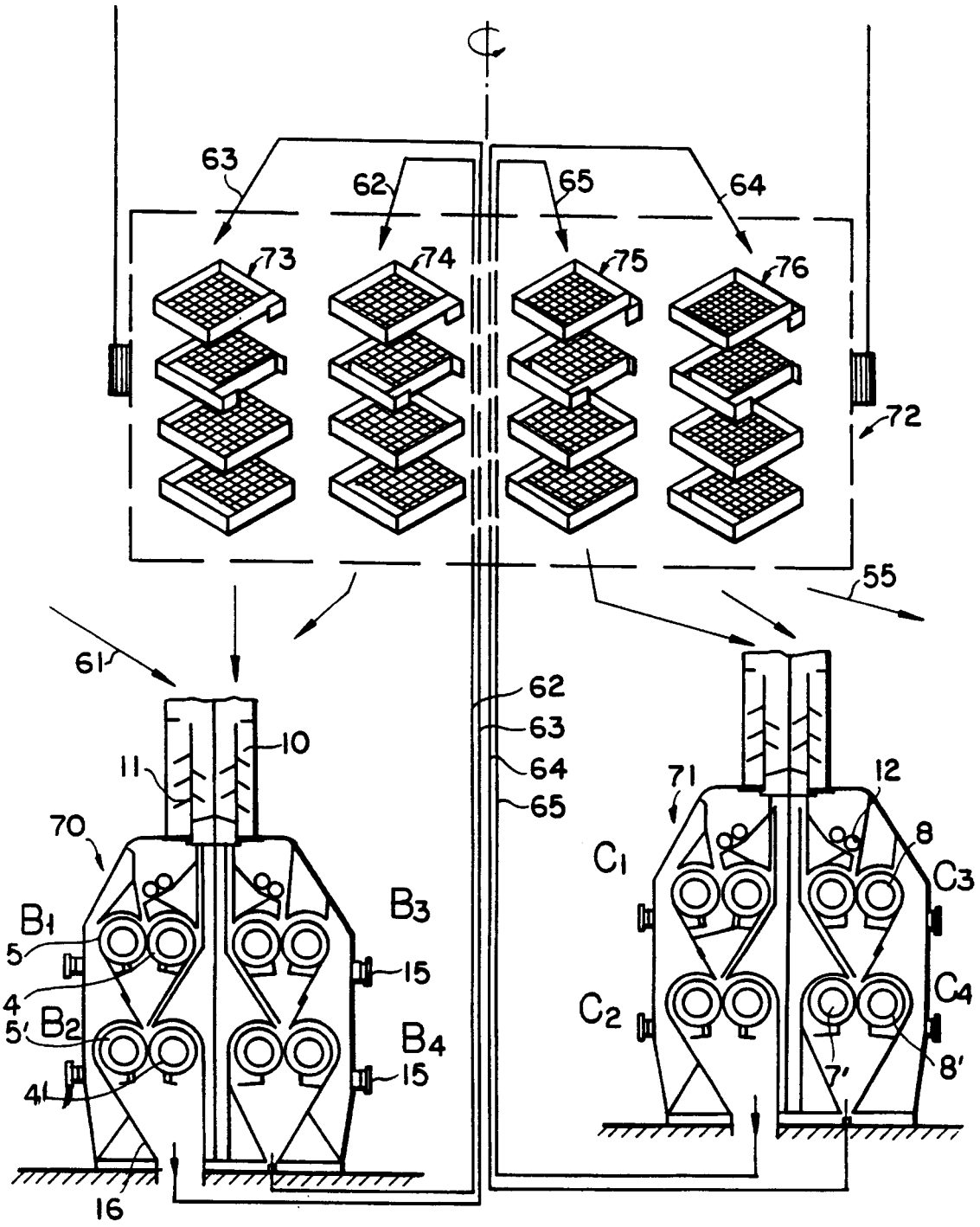
FIG. 4 shows the grinding and sifting unit and FIG. 5 shows the new grinding process in a diagrammatic manner.

FIG. 4 shows the actual core of the starch mill, wherein the grinding and sifting passes are shown in an enlarged manner. This is a module having a milling capacity of 100 to 200 tons daily output. Two eight-roll mills 70 and 71, respectively, and a large plansifter 72 are required for this. The first eight-roll mill 70 contains the grinding passes $B_1$ and $B_2$ as first double pass and $B_3$, $B_4$ as a second double pass. The second eight-roll mill contains grinding passes $C_1$, $C_2$ as a first double pass and $C_3$, $C_4$ as a second double pass, that is, a total of four double-grinding passes. The plansifter 72 constitutes in itself a single oscillating unit. Four sifting divisions 73, 74, 75, 76 are shown which are arranged vertically one on top of the other, wherein the product streams are only shown in a very schematic manner. But, the plansifter can comprise completely different gradations, that is, also six or eight vertically arranged sifting divisions. Every vertical sifting division can be divided two or more times in height, whether this is for double streams or for another guiding of the product corresponding to an optimization of the utilization of the sifters. Also shown only in a schematic manner is the first influx 61 of unground grain material at $B_1$, intermediate liftovers 62, 63, 64, 65 and the conveying system with the good starch fraction which is shown by arrow 55 pointing outward.

Figure 5:
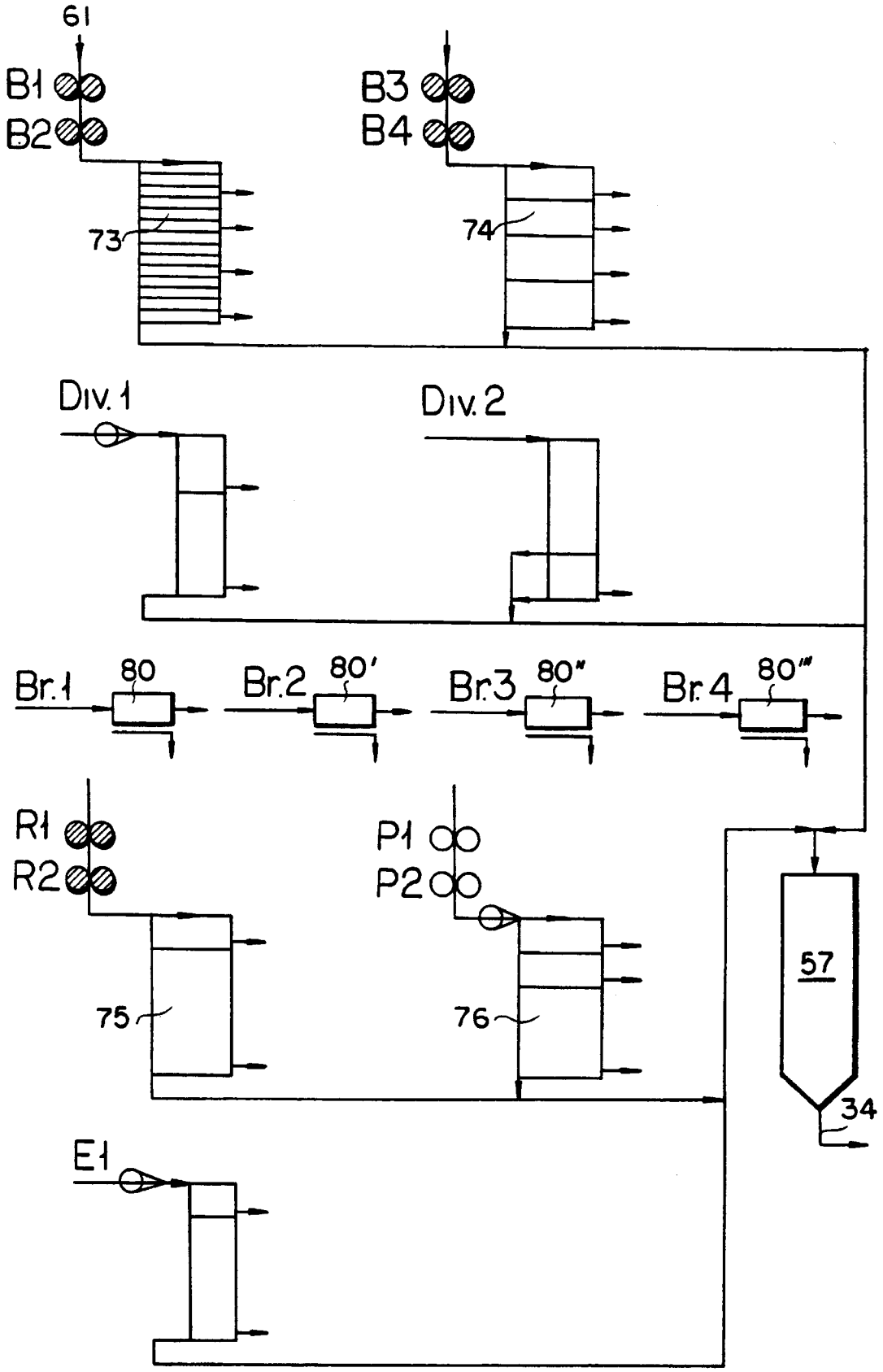

FIG. 5 shows a milling process diagram shown in a manner similar to the solution of the prior art shown in DE-PS 26 42 628. As can be seen, both the number of sifting passes and the number of grinding passes have now been drastically reduced. However, the four bran brushes 80 for increasing the output of endosperm fractions remain.

The prepared raw grain (e.g. wheat) is fed to the first grinding-roll pair $B_1$. The first bruised grain and broken up grain, respectively, produced by $B_1$ proceeds directly to the second grinding-roll pair, to $B_2$, without sifting between $B_1$ and $B_2$. After the second grinding, the so-called second bruised grain obtained is guided to the first sifting division 73. The second bruised grain is divided up into different granulations by the plansifting of the sifting division 73, wherein the fraction intended for $B_3$ is temporarily guided via a $Br._1$ to a first bran brush (80) and the tailings are then directly transferred into the third grinding $B_3$. The material, which is still in the form of bruised grain, is ground by means of $B_3$ and ground by means of $B_4$ directly afterward. The $B_4$ bruised grain, which is now produced in the second double grinding, proceeds to the second sifting division 74, wherein the material is again divided up into a plurality of granulations.

A portion of the fraction from the first and second sifting passes is given to dividers Div. 1, Div. 2 which produce a still finer granulation.

The coarse tailings from both the first and second sifting passes (from sifting divisions 73 and 74) are guided to the corresponding bran brushes 80 ($Br._1$, $Br._2$, $Br._3$, $Br._4$) depending on the respective given conditions. The tailings from the divider (Div. 1) proceed directly to the first reduction passes $R_1$ ($C_1$). From there, the material is again guided directly to the second reduction pass $R_2$ ($C_2$) without intermediate sifting, and the product which is reduced by means of $R_2$ is given directly to a third sifting division 75.

The semolina or middlings resulting in the third sifting pass is then given to the fourth reduction pass $P_1$ ($C_3$) and, right after this, the second stage of the same reduction pass $P_2$ ($C_4$), and the resulting refined middlings are given to the fourth sifting division 76. The tailings of the fourth sifting pass 76 are additionally crushed in an impact mill $E_1$ and guided directly to the following sifting division.

The finest fraction (the lowest siftings), as well as the lowest siftings of all remaining sifting portions proceeds from the sifting divisions into the intermediate storage 57 to 57" as finished product and is ready for processing in the starch mill.

It can be advantageous to insert a detacher (for detaching flakes)—designated in a symbolic manner with a circle and cone—between the reduction double passes $R_1$–$R_2$ and $P_1$–$P_2$, respectively, and the corresponding sifting division 75 and 76, respectively.

We claim:

1. In a method for the production of a starch raw material for subsequently obtaining pure starch from wheat, rye, corn or barley, wherein fractions of the starch raw material which are damaged as little as possible are produced by means of roll grinding and sifting devices, wherein the material is ground repeatedly and sifted with a system of advanced milling, the improvement comprising the steps of: guiding the material two *to five* times via double grinding stages wherein each double-grinding stage comprises a first and second grinding and the material is ground without sifting between the first and second grindings and sifting the ground material following the second grinding.

2. A method for the production of a starch raw material for subsequently obtaining pure starch from wheat, rye, corn or barley, wherein fractions of the starch raw material which are damaged as little as possible are produced by means of roll grinding and sifting devices, wherein the material is ground repeatedly and sifted with a system of advanced milling, the improvement comprising the steps of: guiding the material four times via double-grinding stages wherein each double-grinding stage comprises a first and second grinding and the material is ground without sifting between the first and second grindings and sifting the ground material following the second grinding.

3. A method according to claim 1, wherein three to five single grindings are carried out in combination with the double grindings with an intermediate sifting in each instance particularly for size reduction.

4. A method according to claim 2, wherein the material undergoes double grinding at least at bruising stages B1/B2, B3/B4, and reduction stages C1/C2 and C3/C4.

5. In a starch milling system for the production of starch raw material from wheat, rye, corn or barley for subsequently obtaining pure starch, the improvement comprising two *to five* double grinding passes, each pass comprising two grinding-roll pairs arranged so that the grind output of one pair directly forms the input of the next pair without sifting therebetween, thereby defining a double-grinding pass, said grinding passes being pan of an eight roll roller mill with two sets of grinding roll pairs arranged one above the other.

6. A starch milling system according to claim 5, wherein the system comprises at least one eight-roll roller mill, each eight-roll roller mill with two sets of two grinding-roll pairs which are arranged one above the other.

7. A starch milling system according to claim 5, wherein each of the grinding-rolls pairs has its own grinding gap adjustment.

8. A starch milling system according to claim 6, wherein, in the eight-roll roller mills, an adjustable feed regulating device is assigned to the roll pair located on top in the eight-roll roller mills, and a funnel-shaped product guide is arranged between the roll pair located on top and the roll pair located at the bottom for directly transferring from the roll pair located on top to the roll pair located at the bottom.

9. A starch mill according to claim 5, grinding gap adjusting devices and a control gate for removing samples after every grinding pass are assigned to each roll pair.

10. A starch milling system according to claim 5, wherein each roll pair has a feed space and a grinding gap and the feed space of the upper roll pair as well as the feed space of the lower roll pair and the grinding gap of the lower roll pair are connected to an aspirating arrangement via ducts.

11. A starch milling system according to claim 5, wherein every roll pair is completely equipped with an individual adjusting device, as well as a device for protection against foreign bodies, and the rolls of each pair have different rotating speeds, wherein the roll pairs located one on the top of the other include a moving-out device which is controlled jointly.

12. A starch milling system according to claim 5, wherein the rolls of each roll pair are arranged in the same horizontal plane.

13. A starch milling system according to claim 5, wherein it comprises a compact cleaning apparatus, at least two eight-roll roller mills and a large plansifter.

14. A starch milling system according to claim 6, wherein the grinding gap adjusting device is assigned in each instance to a remote control and computer means for storing and retrieving the specific grinding gap settings for every grinding task, as well as all other adjusting values of processing and transporting means.

* * * * *

UNITED STATES PATENT AND TRADEMARK OFFICE

CERTIFICATE OF CORRECTION

PATENT NO. : Re. 35,202

DATED : April 9, 1996

INVENTOR(S) : WERNER BALTENSPERGER et al.

It is certified that error appears in the above-indentified patent and that said Letters Patent is hereby corrected as shown below:

Claim 5, col. 10, line 1, "grinding passes being pan" should read —double grinding passes being part—.

Signed and Sealed this

Eighteenth Day of June, 1996

*Attest:*

Bruce Lehman

BRUCE LEHMAN

*Attesting Officer*

*Commissioner of Patents and Trademarks*